(12) United States Patent
Inoue et al.

(10) Patent No.: US 10,651,519 B2
(45) Date of Patent: May 12, 2020

(54) BATTERY PACK

(71) Applicant: DENSO CORPORATION, Kariya, Aichi-pref. (JP)

(72) Inventors: Yoshimitsu Inoue, Kariya (JP); Takahiro Jo, Kariya (JP); Hidemitsu Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 15/840,654

(22) Filed: Dec. 13, 2017

(65) Prior Publication Data

US 2018/0166756 A1 Jun. 14, 2018

(30) Foreign Application Priority Data

Dec. 14, 2016 (JP) ................. 2016-242327

(51) Int. Cl.

| | |
|---|---|
| *H01M 10/6551* | (2014.01) |
| *H01M 10/48* | (2006.01) |
| *H01M 2/10* | (2006.01) |
| *H01M 10/42* | (2006.01) |
| *H01M 2/20* | (2006.01) |
| *H01M 10/613* | (2014.01) |

(Continued)

(52) U.S. Cl.
CPC ..... *H01M 10/6551* (2015.04); *H01M 2/1077* (2013.01); *H01M 2/1083* (2013.01); *H01M 2/20* (2013.01); *H01M 10/425* (2013.01); *H01M 10/482* (2013.01); *H01M 10/486* (2013.01); *H01M 10/48* (2013.01); *H01M 10/613* (2015.04); *H01M 10/625* (2015.04); *H01M 10/6554* (2015.04); *H01M 2220/20* (2013.01)

(58) Field of Classification Search
CPC ........... H01M 10/6551; H01M 10/425; H01M 10/482; H01M 10/486; H01M 2/1077; H01M 2220/20; H01M 2/1083; H01M 2/20; H01M 10/613; H01M 10/625; H01M 10/6554; H01M 10/48; B60L 50/60; B60L 50/64; B60L 50/66; B60L 58/00; B60L 58/10; B60L 58/12; B60L 58/24; B60L 58/25

See application file for complete search history.

(56) References Cited

U.S. PATENT DOCUMENTS 6,871,309 B1 * 3/2005 Smith ................ G01R 31/3167
714/724

FOREIGN PATENT DOCUMENTS

| JP | 2014-013722 A | 1/2014 |
|---|---|---|
| JP | 2015-153675 A | 8/2015 |

(Continued)

*Primary Examiner* — Gregg Cantelmo
(74) *Attorney, Agent, or Firm* — Oliff PLC

(57) ABSTRACT

The battery pack includes a base having a heat dissipation wall, a switching device for controlling current having a plurality of electrode terminals, being disposed so as to be capable of transferring released heat to the heat dissipation wall, and a bus bar having a connection terminal that is connected to the switching device or a unit cell so as to enable energization. The connection terminal is disposed so as to be positioned in an area corresponding to a width of the switching device in a direction in which the electrode terminals are arranged in line and in an area extending to a periphery of the switching device in a direction orthogonal to the direction in which the electrode terminals are arranged in line.

6 Claims, 8 Drawing Sheets

(51) Int. Cl.
*H01M 10/6554* (2014.01)
*H01M 10/625* (2014.01)

(56) References Cited

FOREIGN PATENT DOCUMENTS

WO     WO-2012137597 A1 * 10/2012 ........... H05K 1/0203
WO     WO-2016111143 A1 *  7/2016 ......... B60R 16/0239

* cited by examiner

BATTERY PACK

CROSS-REFERENCE TO RELATED APPLICATION

This application is based on and claims the benefit of priority from earlier Japanese Patent Application No. 2016-242327 filed Dec. 14, 2016, the description of which is incorporated herein by references.

TECHNICAL FIELD

A disclosure in this specification relates to a battery pack accommodating batteries therein.

BACKGROUND

A battery pack including a power element capable of performing current control on a battery is disclosed in Japanese Patent Application Laid-Open Publication No. 2014-13722 (Patent Document 1).

A bus bar electrically connected to the power element has a connection terminal connected to a control board.

The connection terminal of the bus bar is connected to the control board at a position distant from the power element in a direction in which a plurality of electrode terminals disposed in the power element are arranged in line.

In addition, since bus bars and power elements have a large heat generation level among electrical components, efficient heat dissipation is also required from a viewpoint of obtaining product performance.

Contents of the prior art document enumerated as prior art are incorporated by reference as an explanation of technical elements in the present specification.

In the battery pack of Patent Document 1, there is a problem that an area occupied by a switching device and the bus bar increases in the arranging direction of the plurality of electrode terminals in the switching device. This problem hinders miniaturization of the battery pack.

SUMMARY

An embodiment provides a battery pack for suppressing an area occupied by a switching device and a bus bar in a direction in which a plurality of electrode terminals are arranged in line in a switching device from broadening, and for improving heat dissipation of the switching device and the bus bar.

A plurality of embodiments disclosed in the present specification adopt different technical means with the same overall concept in order to achieve their respective objectives.

In a battery pack according to a first aspect, the battery pack includes a battery, a casing for accommodating the battery, a base which is a part of the casing and has a heat dissipation wall, a switching device for controlling current having a plurality of electrode terminals, being disposed so as to be capable of transferring heat to the heat dissipation wall, and a bus bar, which is disposed so as to be capable of transferring heat to the heat dissipation wall, having a connection terminal for connecting the switching device and an electrical component.

The connection terminal of the bus bar is disposed so as to be positioned in an area corresponding to a width of the switching device in a direction in which the electrode terminals are arranged in line and in an area extending to a periphery of the switching device in a direction orthogonal to the direction in which the electrode terminals are arranged in line.

According to the battery pack, it is possible to set the installation place of the connection terminals of the bus bars so as not to extend in the electrode terminal arranging direction from the switching devices.

Accordingly, since the area occupied by the connection terminals of the bus bar and the switching device can be limited in the electrode terminal arranging direction, it is possible to suppress the size of the switching device and the device occupied by the bus bar from increasing in the electrode terminal arranging direction.

Further, since the bus bars and the switching devices thus installed are disposed so as to be capable of transferring heat to the heat dissipation wall, while reducing the occupied area, it is possible to realize a path for effectively dissipating heat from the bus bars and the switching devices to the heat dissipation wall, the base and the members on the vehicle side.

It is therefore possible to provide a battery pack that suppresses an area occupied by a switching device and a bus bar in a direction in which a plurality of electrode terminals are arranged in line in a switching device from broadening, and for improving heat dissipation of the switching device and the bus bar.

DETAILED DESCRIPTION OF THE PREFERRED EMBODIMENTS

Figure 1:
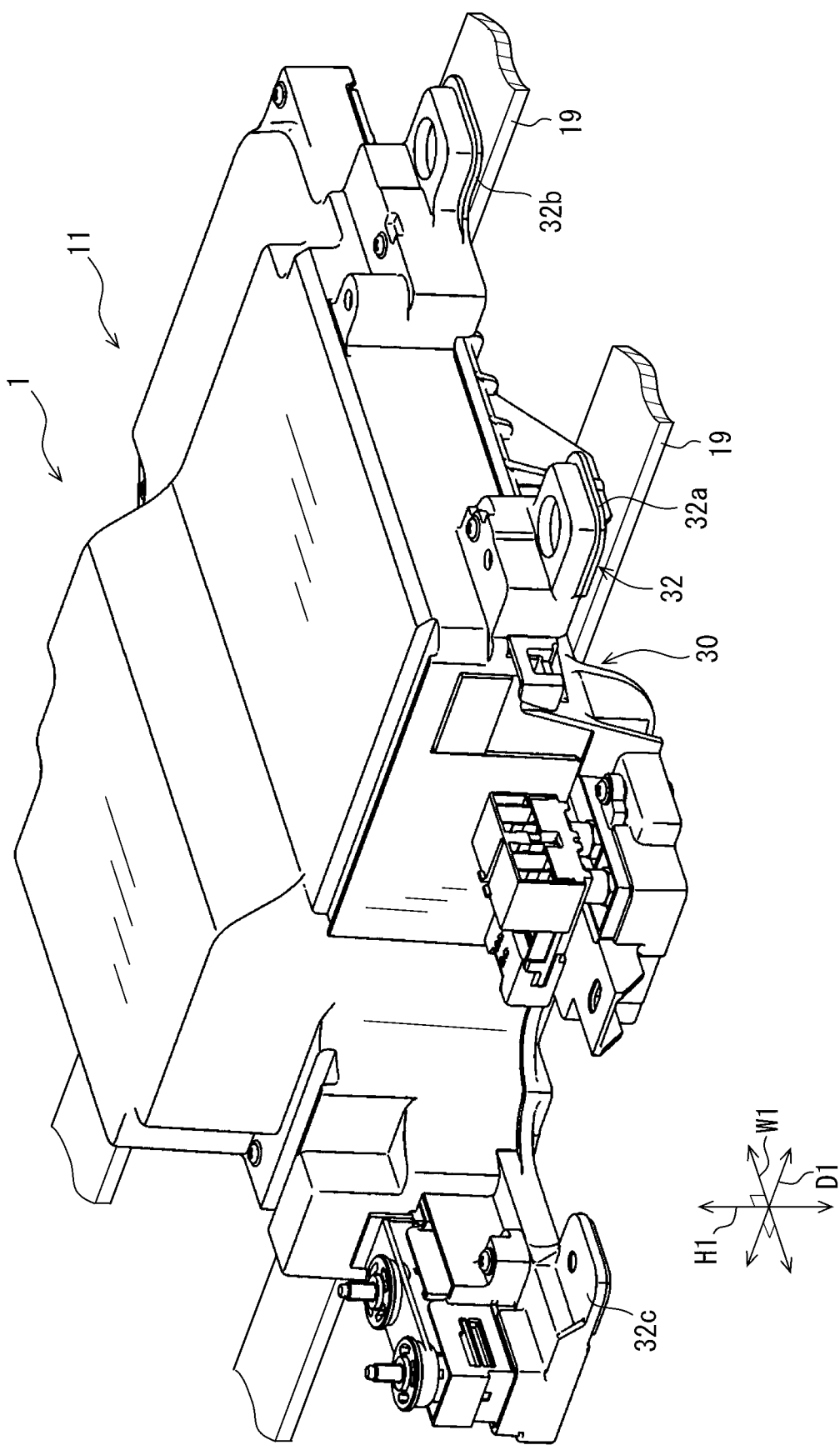
FIG. 1 shows a perspective view of a battery pack according to a first embodiment.

Hereinafter, a plurality of embodiments for implementing the present disclosure will be described with reference to the drawings.

In each of the embodiments, portions corresponding to items described in the preceding embodiment are given the same reference numerals, and redundant explanation may be omitted.

In a case where only a part of a configuration is described in each of the embodiments, the other embodiments described before can be applied to other parts of the configuration.

Not only combinations of parts that clearly indicate that combinations are possible in each embodiment, but it is also possible to combine embodiments partially as long as there is no obstacle to combinations in particular.

First Embodiment

A battery pack 1 of a first embodiment will be described with reference to FIGS. 1 to 8.

In each drawing, a vertical direction or a height direction H1, a width direction W1, and a depth direction D1 are shown.

In the battery pack 1 of the present embodiment, as one of installation examples, the height direction H1 is the vertical direction.

The width direction W1 and the depth direction D1 are also lateral directions orthogonal to the height direction H1.

The battery pack 1 can be applied to a vehicle on which a plurality of unit cells 21 (batteries) are mounted. An example of a vehicle is an automobile. The battery pack 1 is mounted, for example, under a seat of the automobile.

The battery pack 1 is disposed in a space between a front seat and a floor, a space between a rear seat and the floor, a space between a rear seat and a trunk (a storage place), a space between a driver's seat and a passenger seat, and the like of the automobile.

The vehicle is, for example, a hybrid vehicle using the battery pack 1 as a traveling drive source by combining an internal combustion engine and a battery-driven motor, an electric vehicle traveling with a battery-driven motor, or the like. An example in which the battery pack 1 is mounted on a hybrid vehicle will be described in the present embodiment.

The battery pack 1 in the present embodiment is installed such that, for example, the width direction W1 matches with a width direction of the vehicle.

In this case, the width direction W1 of the battery pack 1 corresponds to a collision load direction at the time of a side collision in which an impact is applied to a side portion of the vehicle from the outside.

The battery pack 1 includes a cover 11 and a base 30 as shown in FIG. 1. A part of a casing having at least the cover 11 and the base 30 is fixed to vehicle-side members 19 in the battery pack 1.

The cover 11 and the base 30 form an outer shell of the battery pack 1 and constitute a housing of the battery pack 1. The cover 11 and the base 30 form a pack case for accommodating functional parts.

The cover 11 is made of resin. The cover 11 constitutes an outer shell of an upper portion or a ceiling portion of the battery pack 1. The base 30 constitutes an outer shell of a lower portion or a bottom portion of the battery pack 1.

Figure 2:
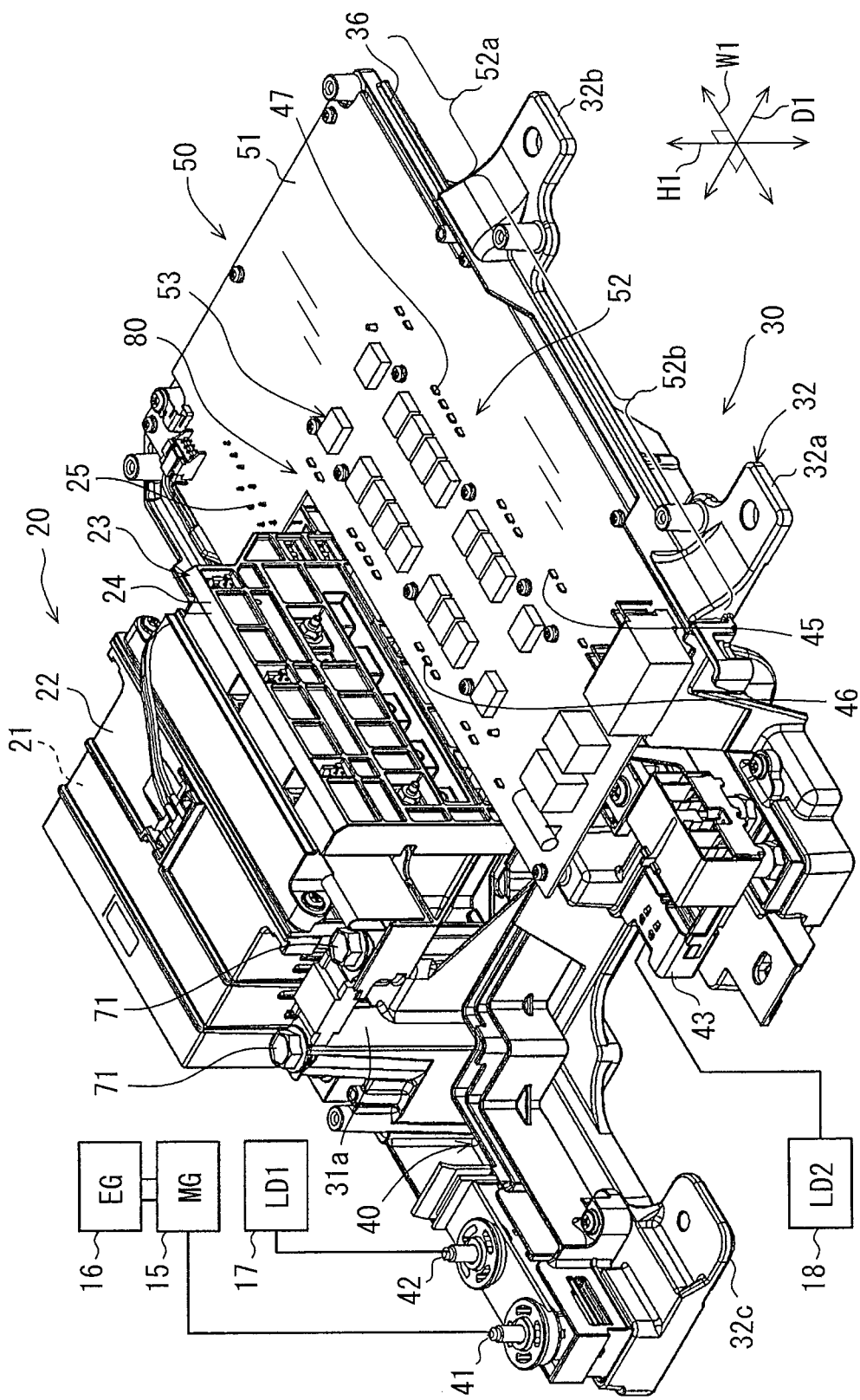
FIG. 2 is a perspective view of the battery pack in a state where a cover is removed according to the first embodiment.
Figure 3:
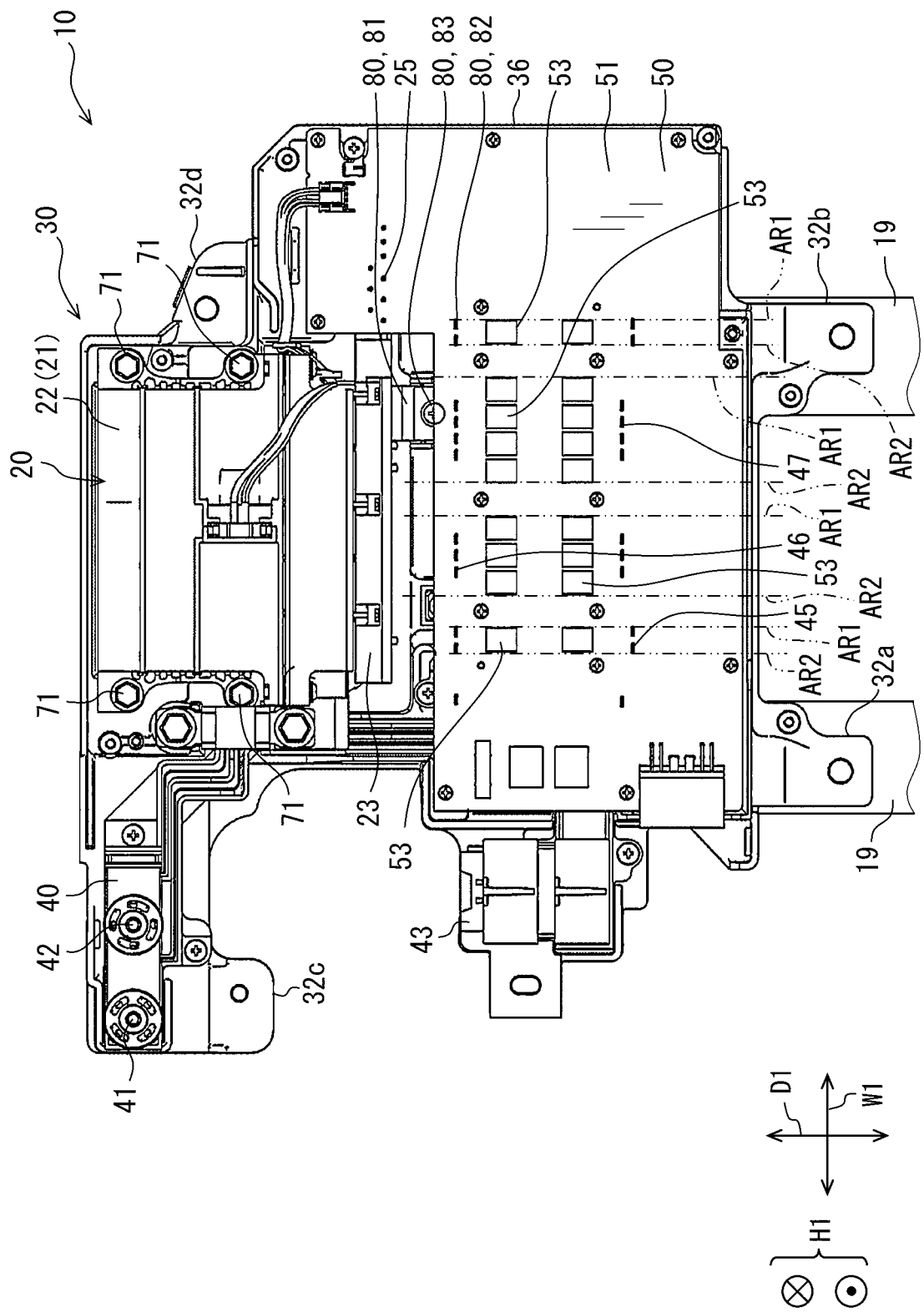
FIG. 3 shows a plan view of the battery pack in the state where the cover is removed according to the first embodiment.

FIG. 2 shows the battery pack 1 with the cover 11 removed.

The battery pack 1 cooperates with a generator motor (MG) 15 of the vehicle. The battery pack 1 provides a motorized system of a vehicle. The generator motor 15 is connected to an internal combustion engine (EG) 16.

The battery pack 1 is connected to an electric load (LD1) 17 and another electric load (LD2) 18 in the vehicle. The electric load 17 is an electric load through which a large current flows, such as a battery and a starter. The other electric load 18 is a part or the whole of a plurality of electric loads of the vehicle except the battery and the starter.

The generator motor 15 functions as a generator by being driven by the internal combustion engine 16. At least a part of the electric power generated by the generator motor 15 is supplied to the battery pack 1, whereby the battery pack 1 is charged.

The generator motor 15 functions as an electric motor as the electric power is supplied from the battery pack 1 to the generator motor 15. The generator motor 15 functions as a power source together with the internal combustion engine 16.

The generator motor 15 supplies the power that exceeds the power supplied by the internal combustion engine 16 or the power that assists the power supplied from the internal combustion engine 16, for example.

The battery pack 1 includes a battery unit 20, the base 30, a bus bar unit 40, and an electric circuit 50. The battery unit 20, the bus bar unit 40, and the electric circuit 50 are mounted on the base 30. The electric circuit 50 is a functional part including a substrate 51 and a plurality of electrical components 52. The base 30 has a concave container portion 31 for installing the battery unit 20.

In the base 30, only a part (for example, a lower portion) of the battery unit 20 is accommodated in the container portion 31, and the remaining part (for example, an upper part) of the battery unit 20 protrudes from the base 30.

The battery unit 20, the bus bar unit 40, and the electric circuit 50 are attached to the base 30 along the height direction H1 which is an assembling direction thereof.

The battery unit 20, the bus bar unit 40, and the electric circuit 50 are fixed to the base 30 by fastening members such as a plurality of screws or bolts.

The battery pack 1 has conductive connecting members 80 for electrically connecting the battery unit 20 and the electric circuit 50.

The battery unit 20 has main terminals. The main terminals provide intermittently controlled output lines. The main terminals are positive terminals as the battery unit 20. The connecting members 80 are conductive members for connecting the positive terminals and the electric circuit 50.

The connecting members 80 are provided by a bus bar which is a metal plate having a predetermined shape in the present embodiment.

In a manufacturing method of the battery pack 1, the bus bar is manufactured by cutting a metal plate into a predetermined shape and bending it into a predetermined shape, or the like. The connecting members 80 has a first bus bar 81 connected to the battery unit 20 and a second bus bar 82 connected to the electric circuit 50. The connecting members 80 have a fixing member 83 such as a bolt for fastening the first bus bar 81 and the second bus bar 82.

The first bus bar 81 is electrically connected by being fixed to the positive terminals of the plurality of unit cells 21 included in the battery unit 20 by fixing means.

The first bus bar 81 has an opening portion for receiving the fixing member 83. The first bus bar 81 has a shape protruding from the battery unit 20 toward the substrate 51 along the depth direction D1.

The fixing member 83 fastens the first bus bar 81 along the height direction T1. The fixing member 83 also fastens the second bus bar 82 along the height direction T1.

The second bus bar 82 extends from a tightening position to a lower side of the substrate 51 and extends toward the substrate 51. The second bus bar 82 has a plurality of terminals penetrating through the substrate 51. The second bus bar 82 is electrically connected to the electric circuit 50 by being fixed by fixing means.

The fixing means is a solder. The fixing means can also be provided by various means such as welding, or tightening with bolts.

The second bus bar 82 has a plurality of terminal portions for being connected to the electric circuit 50. The second bus bar 82 has an opening portion for receiving the fixing member 83.

The battery unit 20 has a battery case 22 that accommodates the plurality of unit cells 21. The battery case 22 is made of electrically insulating resin. The battery case 22 is a part of a container that accommodates the plurality of unit cells 21.

The battery case 22 fixes the plurality of unit cells 21 to each other. Further, the battery case 22 is also a fixing member for fixing the plurality of unit cells 21 to the base 30.

The battery case 22 has a plurality of brackets for fixing the battery unit 20 to the base 30. The battery case 22 has a plurality of ribs to increase the strength of walls and/or to reduce gaps between the battery case 22 and the base 30.

The battery unit 20 has a monitor module 23. The monitor module 23 has an electrically insulating resin member and monitor connecting members 25 connected to the plurality of unit cells 21.

The monitor connecting member 25 is embedded in the resin member 24 by insert molding. The monitor connecting member 25 passes through the resin member 24 to connect the unit cells 21 and the electric circuit 50.

The monitor module 23 has a water sensor having a plurality of water detection electrodes. The monitor module 23 is disposed along one surface of the battery case 22 which is a hexahedron. The monitor module 23 is also a lid of the battery case 22.

The base 30 is made of a conductive metal. The base 30 is also called a carrier. The base 30 can be formed by, for example, aluminum-die casting. The base 30 has high thermal conductivity as well as high rigidity. The base 30 includes the container portion 31 for accommodating the battery unit 20.

The base 30 has a plurality of stays 32a, 32b, 32c, 32d. The plurality of stays 32a, 32b, 32c, 32d are collectively referred to as the stays 32. The stays 32 are fixing parts fixed to the vehicle-side members 19 in order to fix the battery pack 1 to the vehicle.

The vehicle-side members 19 are parts of a vehicle to which the battery pack 1 is attached for fixing the battery pack 1, and is, for example, a plate-like frame or a panel.

The stays 32 are provided with mounting holes for inserting bolts or the like as an example of fixing means for fixing the stays 32 to the vehicle-side members 19. The stays 32 may be fixed to the vehicle-side members 19 by fixing means such as welding.

Figure 5:
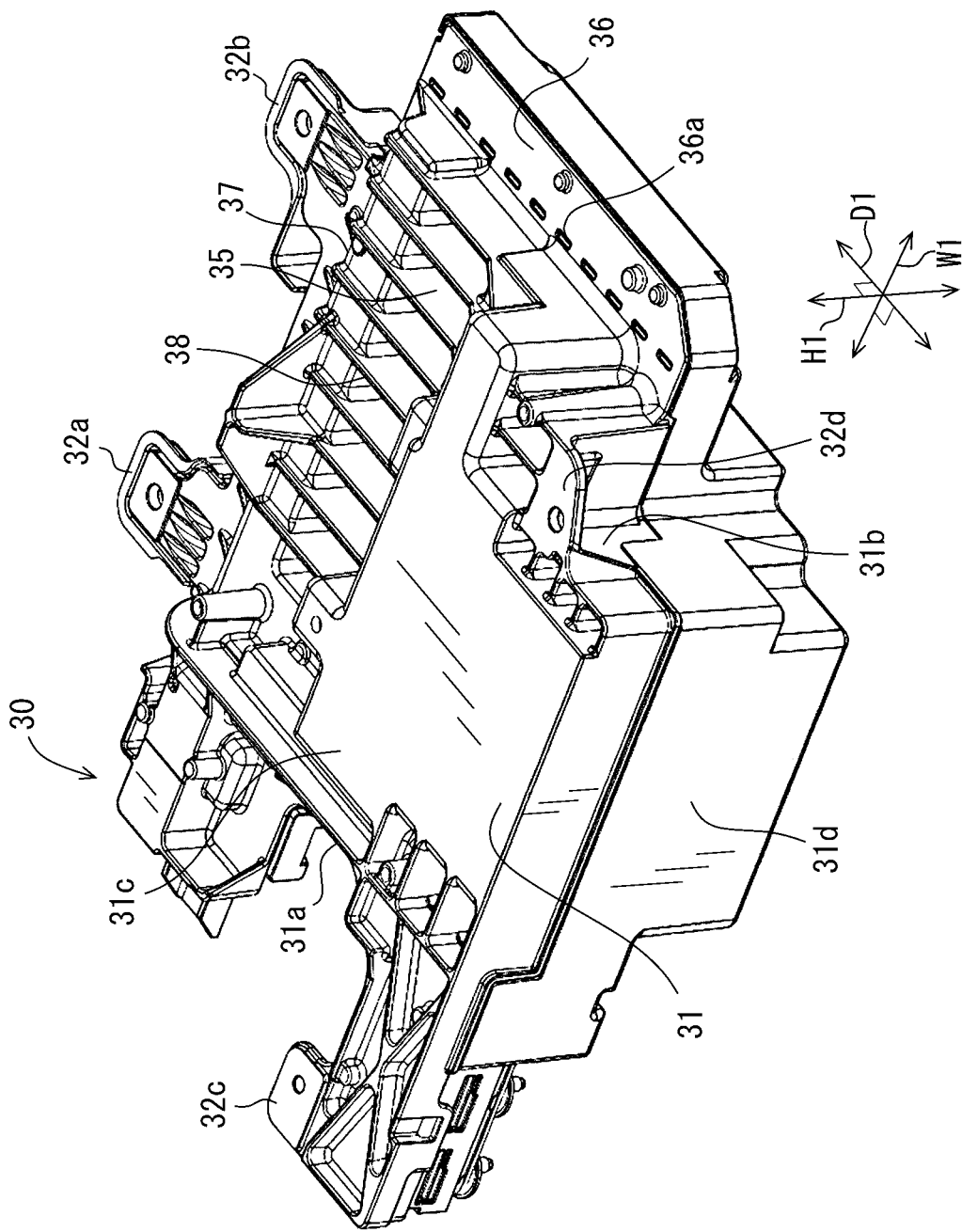
FIG. 5 shows a perspective view of a lower surface side of the base of the battery pack according to the first embodiment.

As shown in FIG. 5, the base 30, which is a part of the casing, includes thin wall portions 36a disposed in a widthwise end portion 36 existing at a position protruding outward from the unit cell 21 and the stays 32.

The widthwise end portion 36 is a portion located outside the container portion 31 and a heat dissipation wall 35 in the base 30, and is a portion where a light electrical section 52a of the substrate 51 is installed.

The thin wall portions 36a are fragile portions having lower rigidity than the surroundings, and are constituted by groove portions recessed in a rectangular section from the lower surface side of the base 30 opposed to the substrate 51.

The thin wall portions 36a are constituted by a plurality of grooves disposed so as to be arranged in line over the entire length in the longitudinal direction of the vehicle at the widthwise end portion 36.

With this configuration, the base 30 is provided with the fragile portions over the entire length in the longitudinal direction of the vehicle at the widthwise end portion 36, so that when the external force acts, the widthwise end portion 36 over the entire length in the longitudinal direction of the vehicle is easily broken.

The thin wall portions 36a are the portions constituted by the groove portions recessed from a lower surface toward an upper surface of the widthwise end portion 36 placed on the substrate 51.

The thin wall portions 36a are thinner than the surrounding portions by the depth of the recess forming the groove portion.

Further, the thin wall portions 36a may be portions constituted by groove portions recessed from the upper surface to the lower surface of the widthwise end portion 36.

The plurality of grooves may be provided so as to form a plurality of rows arranged in the width direction W1 of the vehicle.

The widthwise end portion 36 is disposed at an end portion of the battery pack 1 in the width direction W1 of the vehicle. The widthwise end portion 36 is a plate-like portion located in the base 30 near a side portion of a vehicle outer shell.

The widthwise end portion 36 is disposed in the base 30 so as to have a positional relationship in which it faces the side portion of the vehicle outer shell such as a door portion.

Therefore, when an impact is applied to the side portion of the vehicle, for example, when some object collides with the side portion of the vehicle, an external force acts on the widthwise end portion 36 of the base 30 as the side portion of the vehicle outer shell is recessed inward.

The thin wall portions 36a are fragile portions configured to have a strength such that they are more easily deformed by the external force than the portions surrounding the base 30.

The thin wall portions 36a constitute portions having a smaller thickness than the portions surrounding the base 30 and correspond to portions having low rigidity in the widthwise end portion 36.

The thin wall portions 36a are disposed at positions protruding from the unit cell 21 in a direction intersecting with a direction in which the stays 32b, which are the fixing portions to the vehicle-side members 19, protrudes with respect to the unit cell 21.

The thin wall portions 36a are disposed at positions protruding toward the side of the vehicle outer shell more than the unit cell 21 is in the width direction W1 of the vehicle; the width direction W1 intersects the longitudinal direction of the vehicle in which the stay 32b is protruding with respect to the unit cell 21.

The thin wall portions 36a are provided at positions protruding outward in the width direction W1 of the vehicle by more than the unit cell 21 and the stays 32b, 32d are, and are present at positions closer to the side portion of the vehicle than the unit cell 21 and the stays 32b, 32d are.

The stays 32b, 32d are disposed at positions protruding further in the longitudinal direction of the vehicle more than the thin wall portions 36a are.

The thin wall portions 36a are disposed at positions protruding in the width direction W1 of the vehicle more than the vehicle members 19 are to which the stay 32b is fixed, and are present at positions closer to the side portion of the vehicle than the vehicle-side members 19 are.

The bus bar unit 40 provides power paths extending from power terminals of the battery unit 20. The bus bar unit 40 has electrically insulating resin members and power connecting members connected to the battery unit 20.

The bus bar unit 40 is fixed on the base 30. The bus bar unit 40 has a power terminal 41, a power terminal 42, and a power terminal 43. The bus bar unit 40 has at least two power connecting members.

One power connection member is disposed between one power terminal and another power terminal of the battery unit 20 to provide an electrical connection.

The power terminal 41 located outside the power terminal 42 is connected to the generator motor 15. The power terminal 42 located inside the power terminal 41 is connected to the electric load 17. The power terminal 43 is connected to the electric load 18.

The bus bar unit 40 is also a member for connecting the plurality of power terminals 41, 42, 43, the battery unit 20 and the electric circuit 50.

The electric circuit 50 is fixed on the base 30. The electric circuit 50 is disposed so as to spread to the side of the battery unit 20. The electric circuit 50 has such a size and shape as to spread across a side of one face of the battery unit 20 and a side of another face of the battery unit 20.

The battery unit 20 is installed at one corner of the base 30 having a substantially quadrilateral shape. The electric circuit 50 occupies a range extending over the base 30 in a hook shape or an L shape spreading to the sides of the battery unit 20.

The electric circuit 50 is installed along the monitor module 23. A part of the electric circuit 50 is installed in a range spreading to the side of the monitor module 23 side of the battery unit 20.

Another part of the electric circuit 50 is installed beside the battery unit 20 so as to spread to the side of a peripheral surface of the monitor module 23.

The electric circuit 50 has the substrate 51 and the plurality of electrical components 52. The substrate 51 is a printed circuit board provided with a wiring pattern.

The substrate 51 is a flat plate which can be referred to as an L shape or a hook shape. The substrate 51 spreads over a horizontal range occupied by the electric circuit 50. The substrate 51 is placed on the heat dissipation wall 35 provided on the base 30.

The substrate 51 and the heat dissipation wall 35 are disposed in direct contact with each other, or indirectly via a heat conductive member such as a sheet or gel having excellent thermal conductivity in a thermal contact state so that heat can be transferred from the substrate 51 to the heat dissipation wall 35.

The heat dissipation wall 35 and the stays 32 are integrally formed so as to be thermally movable through other parts of the base 30.

Therefore, a heat dissipation path through which the heat transferred from the substrate 51 to the heat dissipating wall 35 dissipates to the vehicle-side members 19 through the stays 32 provided on a first side wall 37 is constructed.

As shown in FIG. 5, the base 30 has at least one rib 38 connecting at least the heat dissipation wall 35 and the first side wall 37. The rib 38 has a surface extending along a direction of the shortest distance connecting the heat dissipation wall 35 and the first side wall 37.

The rib 38 is a plate-like wall protruding from the heat dissipation wall 35 on the lower surface side of the base 30. One end of the rib 38 protrudes from the heat dissipation wall 35, and one end thereof protrudes from the first side wall 37.

A plurality of ribs 38 are arranged in a direction intersecting a direction of the shortest distance connecting the heat dissipation wall 35 and the first side wall 37.

As shown in FIG. 5, the plurality of ribs 38 are arranged over a length equal to or greater than a lateral width of the heat dissipation wall 35.

The plurality of ribs 38 are disposed over both a high power section 52b and the low power section 52a in a state where the base 30 is viewed from the bottom.

The plurality of ribs 38 are disposed over a length equal to or greater than the lateral width of the heat dissipation wall 35.

The plurality of ribs 38 are disposed in a direction crossing or orthogonal to a direction in which the stays 32a and 32b protrude toward the first side wall 37.

Tips of the ribs 38 are located at a height closer to the stay 32 than a bottom wall 31c of the container portion 31 is. The tips of the ribs 38 are located above the bottom wall 31c and are positioned closer to the stays 32.

The ribs 38 are plate-shaped walls extending along the plurality of thin wall portions 36a, and are connecting the heat dissipation wall 35 and the first sidewall 37.

The stays 32 may be provided so as to protrude from the first side wall 37 and a second side wall provided so as to face each other, respectively, or protrude from the first side wall 37 and the second side wall, respectively.

In this case, the ribs 38 are walls connecting the first side wall 37 and the second side wall.

According to the ribs 38, the heat generated by switching devices 53, which are the electrical components 52, moves to the heat dissipation wall 35 via the lower substrate 51, moves downward from the heat dissipation wall 35 along the first side wall 37, and can be moved from the heat dissipation wall 35 to the first side wall 37 through the ribs 38.

Further, the heat is transmitted from the first side wall 37 to the vehicle-side members 19 via the stays 32 at the lower side and is discharged to the outside.

According to this heat dissipation path, a path by which the heat is transmitted from the heat dissipation wall 35 to the first side wall 37 along the heat dissipation wall 35 and a path of which moves downward from the heat dissipation wall 35 and is transmitted to the first side wall 37 via the rib 38 can be constituted.

Therefore, according to the battery pack 1, it is possible to constitute a heat transfer path that transmits the heat to a solid having a thermal conductivity higher than that of air as a heat dissipation path of heat generating elements.

The substrate 51 is a single substrate. The plurality of electrical components 52 are arranged on the substrate 51. The electrical components 52 are elements that generate heat in the battery pack 1, and correspond to the heat generating elements.

The substrate 51 has a plurality of connecting portions. A part or all of the plurality of connecting portions provide connection between the power connecting members of the bus bar unit 40 and the electrical components 52.

The electric circuit 50 is connected to the plurality of unit cells 21. The plurality of electrical components 52 provide a control unit 100.

A control device monitors the voltage of each of the plurality of unit cells 21 included in the battery unit 20. The control device monitors the charging state and the discharging state of each of the plurality of unit cells 21. The control device appropriately controls the charging state of each of the plurality of unit cells 21.

The unit cell 21 is, for example, a nickel hydrogen secondary battery, a lithium ion battery, or an organic radical battery.

The plurality of electrical components 52 include one or a plurality of switching devices 53. The switching device 53 is a device that is on/off controlled by the electric circuit 50. The switching device 53 can intermittently control the output of the battery unit 20.

The switching device 53 intermittently interrupts the current supplied from the positive terminal of the battery unit 20. The switching device 53 is mounted on the substrate 51. The switching device 53 is a semiconductor switch widely known as a transistor, MOS, IGBT or the like.

In addition, the switching device 53 may be configured to be supported while being separated from the substrate 51. Further, the switching device 53 may be a mechanical relay electromagnetically opened and closed.

The switching device 53 is one of the electrical components 52 that generates heat in the battery pack 1, and corresponds to a heat generating element.

In addition to the switching device 53, a resistor may be included in the electrical components which is a heat generating element.

The connecting members 80 electrically connect the positive terminals and the switching devices 53. The connecting members 80 provide at least parts of the conductive members between the positive terminals and the switching devices 53.

The connecting members 80 are disposed in the vicinity of the battery unit 20 on the substrate. The connecting members 80 are disposed on edges of the substrate 51 closest to the battery unit 20. The connection members 80 are connected at portions of the substrate 51 closest to main terminals of the battery unit 20.

A plurality of terminals for the connecting members 80 are arranged on the substrate 51 along the battery unit 20.

The switching devices 53 are disposed close to such connection members 80.

Water may infiltrate into the battery pack 1 when water is spilled on the seat, when a wet occupant uses a seat, or when the vehicle is immersed in water. In this case, the battery pack 1 sometimes discharges via water as a discharge path.

In the present embodiment, the battery pack 1 is provided with a water sensor for detecting water in the battery pack 1 and the control device for executing countermeasure processing when water is detected.

The control device monitors flooding of the battery pack 1. The control device performs countermeasure processing when flooding is detected. The countermeasure processing is, for example, to turn off a breaker element which is one of the plurality of electrical components.

The control system provided by the electric circuit 50 provides a control device which is an electronic control unit. The control device has at least one central processing unit (CPU) and at least one memory device (MMR) as a storage medium for storing programs and data.

The control device is provided by a microcomputer including a computer-readable storage medium. The storage medium is a non-transitory physical storage medium that temporarily stores the computer-readable program.

The storage medium may be provided by a semiconductor memory, a magnetic disk, or the like.

The control device may be provided by a set of computer resources linked by a computer or data communication device. The program is executed by the control device so that the control device functions as the device described in this specification and causes the control device to perform the method described in this specification.

The control system has, as input devices, a plurality of signal sources for supplying signals indicative of information input to the control device. In the control system, the control device acquires information by storing the information in the memory device.

The control system has a plurality of controlled objects of which operations are controlled by the control device as output devices. The control system converts the information stored in the memory device into a signal and supplies it to the controlled object, thereby controlling the operation of the controlled object.

The control device, the signal source and the controlled object included in the control system provide various elements. At least parts of these elements may be referred to as blocks for performing functions.

In another aspect, at least parts of these elements may be referred to as modules or sections that are interpreted as a configuration. Furthermore, the elements included in the control system may also be referred to as means for enabling the function when in an intentional state.

Means and/or functions provided by the control system may be provided by software recorded in a substantive memory device and the computer executing it, software only, hardware only, or a combination thereof.

For example, if the control device is provided by an electronic circuit which is hardware, it can be provided by digital circuitry including a number of logic circuits, or analog circuitry.

The electric circuit 50 may include a circuit as an inverter and/or a converter, and a monitor circuit for monitoring voltages of the plurality of unit cells 21.

The battery unit 20 has a plurality of conductors that connect the plurality of unit cells 21 so as to enable energization. For example, the plurality of conductors connect a plurality of unit cells 21 in series.

The battery unit 20 has a plurality of monitor terminals. The monitor terminals are used for detecting at least the voltage of the unit cells 21.

The monitor connecting members 25 and the monitor terminals are electrically connected to each other. The monitor module 23 and the water sensor are integrally disposed by sharing the resin member 24. The monitor module 23 and the water sensor can be constructed as one component.

Figure 4:
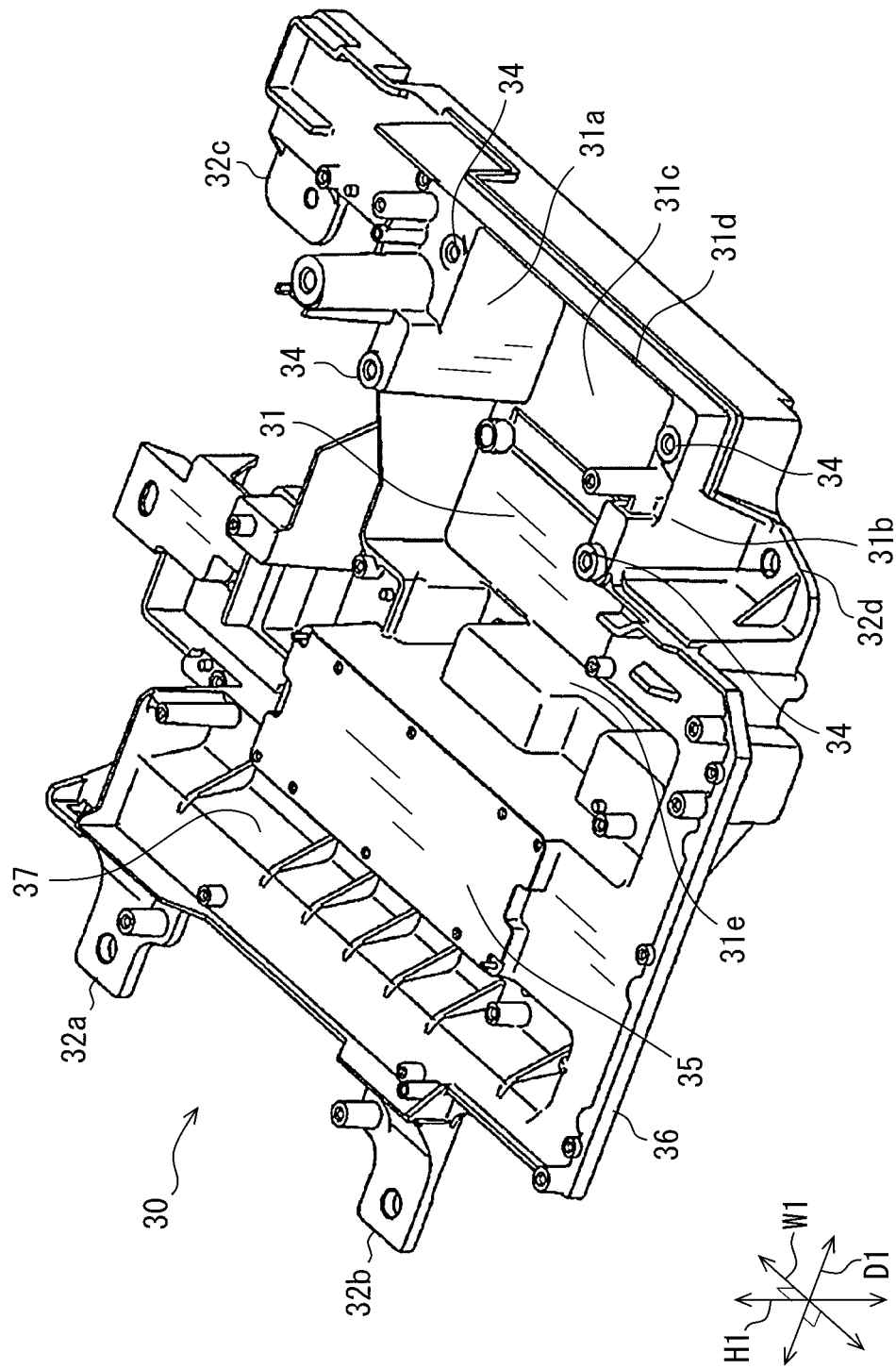
FIG. 4 shows a perspective view of a base of the battery pack according to the first embodiment.

FIG. 4 shows the base 30 in a state in which the electric circuit 50 such as the substrate 51 and the battery unit 20 are removed.

The base 30 has a plate shape or a dish shape. The base 30 has a shape called a shallow dish shape or a shallow cup shape. The shape of the base 30 in the container portion 31 is convex when viewed from below and concave when viewed from top.

The base 30 has a high rigidity against an external force trying to warp it. The base 30 has high rigidity against the external force in the lateral direction in which the container portion 31 is opened, particularly in the width direction W1.

The base 30 has high rigidity with respect to the direction in which the plurality of unit cells 21 swell significantly.

The base 30 has the heat dissipation wall 35. A part of the electrical components 52 is disposed on the heat dissipation wall 35 via the substrate 51. Parts of the electrical components 52 are parts requiring heat dissipation. For example, the switching device 53 in the electric circuit 50 is disposed on the heat dissipation wall 35.

Insulating sheets are disposed between the heat dissipation wall 35 and the electrical components 52, and between the heat dissipation wall 35 and the substrate. With this configuration, the heat of the electrical components 52 moves to the heat dissipation wall 35 via the insulating sheets.

The heat dissipation wall 35 is convex upward and concave from the bottom in the base 30. The heat dissipation wall 35 provides a concave heat radiating portion from the bottom on the lower surface of the base 30.

The substrate 51 installed on the base 30 has the heavy electrical section 52b on which the electrical components 52 for controlling the electric current to the unit cells 21 is disposed, and the light electrical section 52a on which the electrical components 52 to which a current smaller than that of the heavy electrical section 52b flows is disposed.

The heavy electrical section 52b occupies, for example, an area where the switching devices 53 are disposed. The light electrical section 52a occupies, for example, an area where the switching devices 53 are not present, and where the electrical components 52 to which the electric signal is inputted/outputted is disposed.

A part of the substrate 51 closer to the unit cell 21 located on a side opposite to the widthwise end portion 36 in the width direction W1 of the vehicle is the heavy electrical section 52b.

A part located on the widthwise end portion 36 is the light electrical section 52a. Therefore, the plurality of switching devices 53 are not installed on the part of the substrate 51 located above the widthwise end portion 36, and all of the switching devices 53 are located on the side opposite to the widthwise end portion 36 in the width direction W1 of the vehicle. The part located above the thin wall portions 36a is the light electrical section 52a.

Therefore, the plurality of switching devices 53 are not disposed on the part of the substrate 51 located above the thin wall portions 36a, and all of the switching devices 53 are disposed on the portion located on the opposite side to the thin wall portions 36a in the width direction W1 of the vehicle.

The container portion 31 is formed to have at least a side wall 31a, a side wall 31b, the bottom wall 31c, a back wall 31d, and a front wall 31e. The container portion 31 is an open container having an upwardly facing opening portion for installing the battery unit 20.

The side wall 31a and the side wall 31b are disposed on both sides of the container portion 31 in the width direction W1. The side wall 31a and the side wall 31b are disposed so as to face a stacking direction of the plurality of unit cells 21, that is, in the width direction W1.

An inner surface of the side wall 31a and an inner surface of the side wall 31b face inside the container portion 31. The inner surface of the side wall 31a and the inner surface of the side wall 31b are surfaces that face the battery unit 20 in the width direction W1 via a minute gap with the battery unit 20.

The side wall 31a has a plurality of bolt holes for fixing the battery case 22. The side wall 31b has a plurality of bolt holes for fixing the battery case 22.

Each of these bolt holes have a hole having a depth in the height direction H1 which is the assembling direction and a female thread formed on an inner surface of the hole. The side wall 31a and the side wall 31b are also formed with other bolt holes for fixing the cover 11 and other bolt holes for fixing parts for electrical connection.

The bottom wall 31c forms a bottom portion of the container portion 31. The bottom wall 31c is a wall connecting a lower end of the side wall 31a and a lower end of the side wall 31b.

An inner surface of the bottom wall 31c faces inside the container portion 31. The inner surface of the bottom wall 31c faces upward as an upper surface of the base 30 and faces the bottom surface of the battery unit 20.

The back wall 31d is located behind the container portion 31. The back wall 31d is a wall connecting the side wall 31a, the side wall 31b and the bottom wall 31c.

An inner surface of the back wall 31d faces inside the container portion 31 and faces a surface of the battery unit 20 on a side opposite to the monitor module 23.

The back wall 31d connects an upper portion of the side wall 31a and an upper portion of the side wall 31b.

The back wall 31d connects the side wall 31a and the side wall 31b. The back wall 31d provides a beam disposed between the side wall 31a and the side wall 31b. The back wall 31d opposes an external force acting to separate the side wall 31a and the side wall 31b outward and upward.

The front wall 31e is positioned at a front portion of the container portion 31. The front wall 31e is a wall connected to the bottom wall 31c and is a wall rising from the bottom wall 31c.

The front wall 31e may be a wall connecting the side wall 31a, the side wall 31b and the bottom wall 31c. The front wall 31e faces inside the container portion 31 and faces the monitor module 23 of the battery unit 20.

The front wall 31e is a part of a stepped-wall formed between the bottom wall 31c and the heat dissipation wall 35. The front wall 31e connects the side wall 31a and the side wall 31b.

The front wall 31e provides a beam disposed between the side wall 31a and the side wall 31b. The front wall 31e opposes an external force acting to separate the side wall 31a and the side wall 31b outward and upward.

Each of the plurality of bus bars 45, the bus bars 46, and the bus bars 47 has a portion extending along the battery unit 20. The plurality of bus bars 45, bus bars 46, and bus bars 47 extend in parallel.

The plurality of bus bars 45, the bus bars 46, and the bus bars 47 are disposed on both sides of the heat dissipating wall 35 and separated from each other. With such an arrangement, it is possible to provide the battery pack 1 suitable for connection with the electrical components 52 installed on the heat dissipation wall 35. This arrangement can contribute to shortening the current path through which a relatively large current, for example, interrupted by the switching devices 53 flows.

Therefore, it is possible to contribute to suppression of heat generated by the electric circuit 50 by shortening the current path while promoting heat dissipation from the plurality of electrical components 52 by the heat dissipation wall 35.

The connecting members 80 are provided between the battery unit 20 and the heat radiating wall 35. The connecting members 80 which are also parts of the bus bar unit 40 are adjacent to the heat dissipation wall 35.

Therefore, the connection member 80 can also contribute to suppression of the heat generated by the electric circuit 50 since it is possible to form a heat dissipation path for heat transfer to the heat dissipation wall 35.

The battery unit 20 is mounted on the base 30. The battery case 22 is fixed to the base 30 by a plurality of bolts 71.

The plurality of bolts 71 are inserted into bolt holes provided in the base 30. The plurality of bolts 71 tighten the brackets disposed on the battery case 22 toward the base 30. The plurality of bolts 71 function as fastening members.

Figure 6:
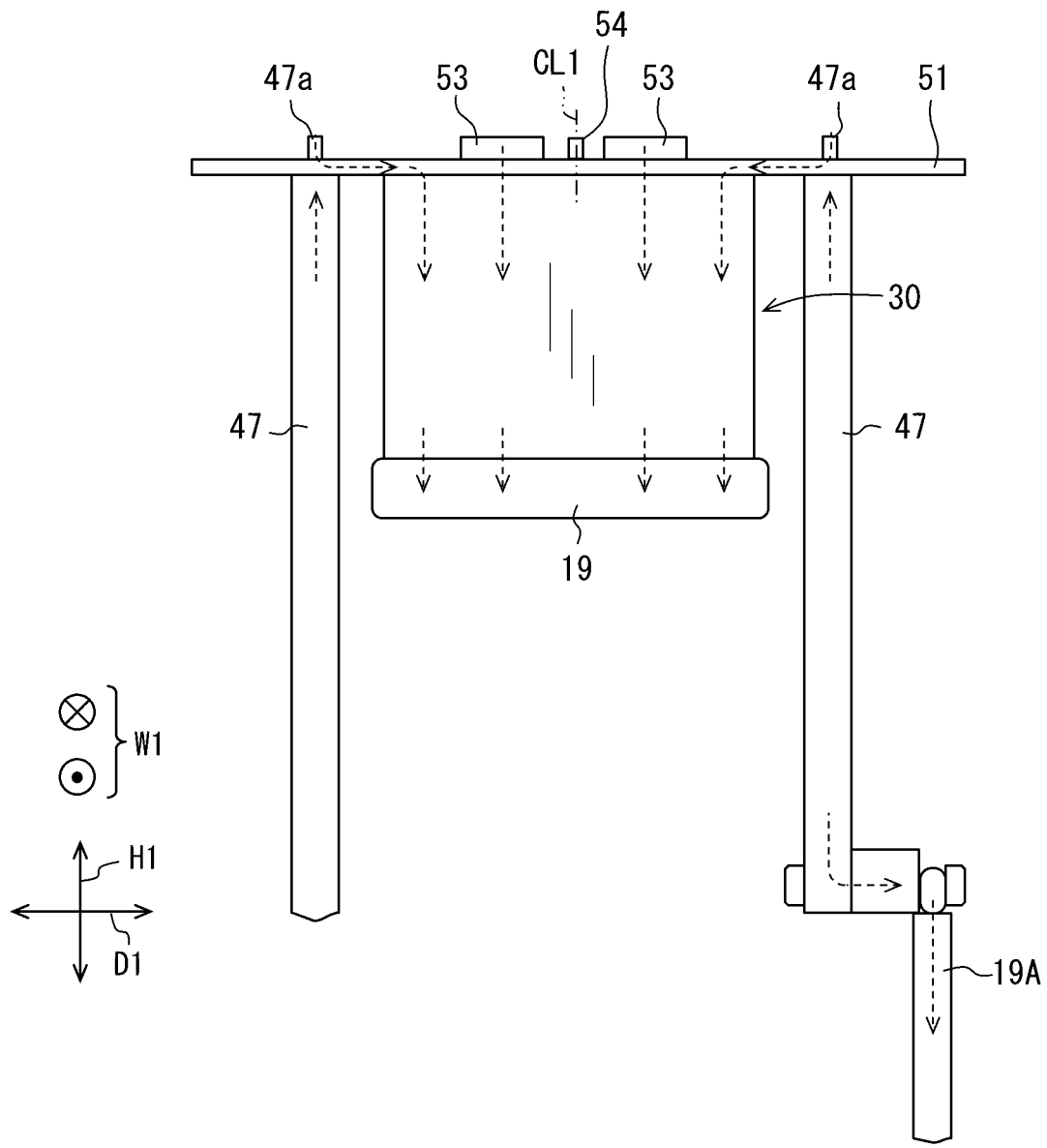
FIG. 6 shows a diagram of heat transfer paths from a switching device and a bus bar in the battery pack according to the first embodiment.
Figure 8:
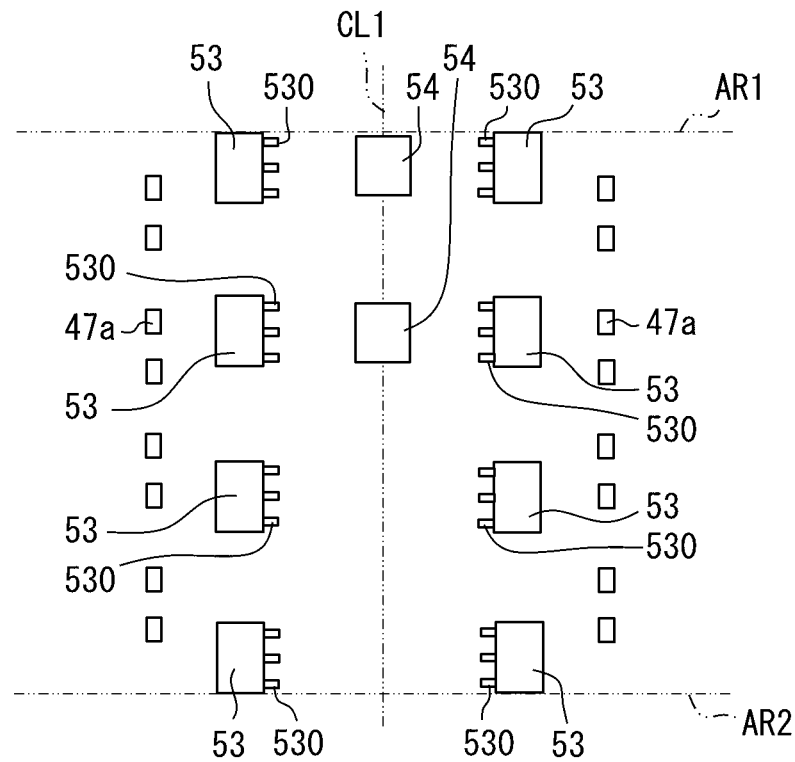
FIG. 8 shows a partial plan view of a positional relationship between the switching device and a connection terminal of the bus bar in the battery pack according to the first embodiment.
Figure 8:
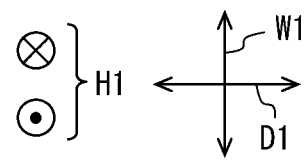

As shown in FIG. 6 and FIG. 8, each of the switching devices 53 has a plurality of electrode terminals 530 and is disposed so as to be able to transfer heat to the heat dissipation wall 35.

The plurality of electrode terminals 530 are arranged in line in the width direction W1, and this direction is referred to as an electrode terminal arranging direction. The bus bars 47 have connection terminals 47*a* to connect the switching devices 53 and the electrical components 52 so as to be energizable.

The bus bars 47 are disposed so as to be capable of transferring heat to the heat dissipation wall 35. The bus bars 47 are connected to a harness 19A on the vehicle side and the unit cells 21 so as to be capable of transferring heat.

It should be noted that although the bus bars 47 will be described as a representative, the description here is also applied to the bus bars 45 and the bus bars 46.

The connection terminals 47*a* are parts of the bus bar 47 that are connected to conductive patterns disposed on the substrate 51 so as to be energizable. Therefore, the bus bars 47 are disposed so as to be capable of transferring heat to the substrate 51.

The heat generated by the bus bars 47 are transferred to the heat dissipation wall 35 via the substrate 51 and can be dissipated to the vehicle-side members 19 through the base 30. Also, the heat generated by the bus bars 47 can also be transferred to the harness 19A on the vehicle side.

The switching devices 53 are connected to the conductive patterns disposed on the substrate 51 so as to be energizable. Therefore, the switching devices 53 are disposed so as to be capable of transferring heat to the substrate 51.

The heat generated by the switching devices 53 is transferred to the heat dissipation wall 35 via the substrate 51 and can be dissipated to the vehicle-side members 19 or a vehicle underbody through the base 30.

In this manner, the heat generated by the switching devices and the heat generated by the bus bar 47 are configured to be transferred to the base 30 with the substrate 51 as a relay path.

As shown in FIG. 8, the connection terminals 47*a* are positioned in an area corresponding to the width of the switching devices 53 in the electrode terminal arranging direction.

The connection terminals 47*a* are positioned in an area extending to a periphery of the switching devices 53 in the depth direction D1 which is a direction orthogonal to the electrode terminal arranging direction. This area is an area occupying an area between a two-dot chain line AR1 and a two-dot chain line AR2 shown in FIG. 8.

Therefore, the connection terminals 47*a* are disposed so as not to exist outside the two-dot chain line AR1 and the two-dot chain line AR2 with respect to the corresponding switching devices 53.

The switching devices 53 of the battery pack 1 are constituted by the plurality of switching devices 53 arranged in line in the electrode terminal arranging direction. When the switching devices 53 of the battery pack 1 are configured by four or more switching devices 53 arranged in line in the electrode terminal arranging direction, it is possible to provide the high capacity battery pack 1.

The switching devices 53 of the battery pack 1 are configured to include at least one pair of two switching devices 53 that are arranged to face each other in a direction orthogonal to the electrode terminal arranging direction.

In the configuration shown in FIG. 8, four sets of switching devices 53 are provided. The connection terminals 47*a* are disposed at positions bilaterally symmetrical with respect to a center line CL1 between the two switching devices 53 arranged in opposition as described above.

Therefore, four pairs of switching devices 53 and connection terminals 47*a* are disposed symmetrically with respect to the center line CL1.

The battery pack 1 further includes temperature detectors 54 positioned in the middle of the two switching devices 53 arranged to face each other. The respective temperature detectors 54 convert temperature information at the present position into an electric signal and outputs it to the control unit 100. The temperature detector 54 is also a temperature sensor that output a detection signal to the control unit 100.

In the configuration shown in FIG. 8, the temperature detector 54 is disposed in the middle of two switching devices 53, which are two sets out of the four sets of switching devices 53. The position of the temperature detector 54 is not limited to the position between the switching devices 53 shown in FIG. 8.

Figure 7:
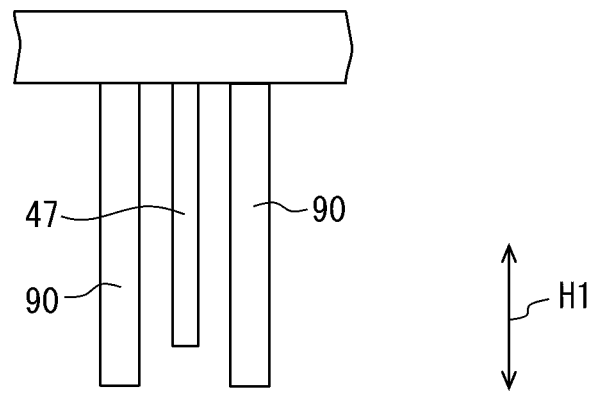
FIG. 7 shows a partial view showing a configuration for insulating the bus bar.

As shown in FIG. 7, a periphery of the bus bar 47 is surrounded by insulating members 90.

It is preferable that clearances are provided between outer surfaces of the bus bar 47 and inner surfaces of the insulating members 90. It is preferable that the insulating member 90 is formed of, for example, a polybutylene terephthalate resin. It is preferable that a distal end of the bus bar 47 is located inside a distal end of the insulating member 90.

In addition, it is preferable that the switching device 53 and an outer peripheral edge of the base 30 are separated by about 5 mm in the depth direction D1 in consideration of heat dissipation by convection from the switching device 53.

It is preferable that the outer peripheral edge of the base 30 and the outer surface of the bus bar 47 are separated by about 2 to 3 mm in the depth direction D1 in consideration of the assembling workability of the bus bar 47 and electrical insulation.

Next, effects obtained by the battery pack 1 of the first embodiment will be described.

The battery pack 1 includes the base 30 which is a part of the casing for accommodating the unit cells 21 and has a heat dissipation wall 35, and the switching device 53 for controlling current having the plurality of electrode terminals 530 and disposed so as to be capable of transferring heat to the heat dissipation wall 35.

The battery pack 1 further includes the bus bars 45, 46, 47 which are disposed so as to be capable of transferring heat to the heat dissipation wall 35 and which have the connection terminals 47*a* for connecting the switching devices 53 and the electrical components 52 so as to be energizable.

The connection terminals 47*a* of the bus bars 47 are disposed in the area corresponding to the width of the switching devices 53 in the electrode terminal arranging direction in which the plurality of electrode terminals 530 are arranged in line (the width direction W1), and are disposed in the area extending in the direction orthogonal to the electrode terminal arranging direction around the switching device 53.

According to the battery pack 1, it is possible to set the installation position of the connection terminals 47*a* of the bus bars 47 so as not to extend in the electrode terminal arranging direction with respect to the switching devices 53.

Thereby, since the area occupied by the connection terminals of the bus bars and the switching devices 53 can be limited in the electrode terminal arranging direction, the size of the switching devices 53 and a device occupied by the bus bars can be limited in the electrode terminal arranging direction.

Further, since the bus bars and the switching devices 53 thus installed are disposed so as to be capable of transferring heat to the heat dissipation wall 35, while reducing the occupied area, it is possible to realize a path for effectively dissipating heat from the bus bars and the switching devices 53 to the heat dissipation wall 35, the base 30 and the members on the vehicle side.

Therefore, in the battery pack 1, it is possible to limit the area occupied by the switching devices 53 and the bus bars in the electrode terminal arranging direction in the switching devices 53 and to improve the heat dissipation of the switching devices 53 and the bus bars.

The switching devices 53 and the connection terminal s47a of the bus bars 47 are disposed on the substrate 51 and are configured to be able to transfer heat to the heat dissipation wall 35 via the substrate 51.

According to this configuration, the bus bars 47 and the switching devices 53 are disposed so as to be capable of transferring heat to the heat dissipation wall 35 via the substrate 51.

Therefore, while reducing the occupied area, it is possible to realize a path for effectively dissipating heat from the bus bars and the switching devices 53 to the heat dissipation wall 35, the base 30 and the members on the vehicle side via the substrate 51.

Therefore, since the heat generated by the bus bars and the heat generated by the switching devices 53 can be transferred to the heat dissipation wall 35 via the substrate and collected, the heat dissipation performance can be enhanced and the battery pack 1 can be made capable of large current.

In this manner, while reducing the size of the device, the heat dissipation performance from the electrical component such as the switching devices 53 in the battery pack 1 is improved, so that the temperature of the electrical components can be lowered.

By lowering the temperature of the electrical components, the permissible current value to be passed through the electrical components can be increased.

With this effect, the permissible current value in regeneration and output can be improved, so that the fuel consumption of the vehicle can be improved.

In addition, since speed of the temperature of the electrical components can be suppressed from rising by improving the heat dissipation performance, it is possible to limit the control for suppressing the current value from increasing and to provide the high performance battery pack 1.

The battery pack 1 includes one or the plurality of unit cells 21, the base 30, which is a part of the casing accommodating the unit cells 21, having the heat dissipation wall 35 and the first side wall 37, and the stays 32 fixed to the vehicle-side members 19 disposed on the first side wall 37 of the base 30.

The battery pack 1 includes heat generating elements disposed so that the released heat can be transferred to the heat dissipation wall 35, and the ribs 38 having surfaces extending along a direction of the shortest distance connecting the heat dissipation wall 35 and the first side wall 37, and connecting the heat dissipation wall 35 and the first side wall 37.

The heat generating elements are articles that generate heat in the battery pack 1, and are the electrical components 52 and the switching devices 53, for example.

According to the battery pack 1, the heat dissipation path through which heat of the heat generating elements can be transferred from the heat dissipating wall 35, the ribs 38, the first side wall 37, and the stays 32 in the order can be constructed by the ribs 38 connecting the first side wall 37 provided with the stays 32 and the heat dissipating wall 35.

Thereby, it is possible to efficiently transfer the heat generated by the heat generating elements transferred to the heat dissipation wall 35 to the stays 32 through the first side wall 37 and to enhance the heat dissipation performance from the heat generating elements to the vehicle-side members 19.

Therefore, the heat dissipation performance of the battery pack 1 from the heat generating element to the vehicle-side members 19 to which the base 30 is fixed can be improved, and a shrinkage on the base 30 can be suppressed from occurring by the ribs 38.

The battery pack 1 includes the plurality of unit cells 21, the casing that accommodates the unit cells 21, the stays 32 that are disposed on the base 30, which is a part of the casing, and are fixed to the vehicle-side members 19, and the thin wall portions 36a which are parts of the base 30.

The thin wall portions 36a are disposed at positions protruding outward from the unit cell 21 and the stays 32, and are fragile portions configured to have a strength that is more easily deformed by an external force than the portions around the base 30.

The battery pack 1 has the fragile portions, which are the thin wall portions 36a, as parts of the base 30 protruding outward from the unit cells 21 and the stays 32.

As a result, when the impact from the outside is applied to the base 30, it is possible to positively deform, break or buckle the thin wall portions 36a.

By the thin wall portions 36a buckling or the like at a position outside the unit cells 21 and the stays 32, the thin wall portions 36a act as a cushion for absorbing shocks so that it is possible to alleviate the load applied to the battery pack 1 from being transmitted to the inside of the thin wall portions 36a.

Therefore, according to the battery pack 1, it is possible to reduce the load and stress received by the unit cells 21 due to collision or the like, for example, so that the unit cells 21 can be protected.

The thin wall portions 36a are disposed at positions protruding from the unit cell 21 in a direction intersecting the direction in which the stays 32 protrude with respect to the unit cells 21.

According to this configuration, when an external force acts on the battery pack 1 in the intersecting direction, the thin wall portions 36a can be deformed, damaged, buckled, or the like by the external force before the stays 32 are.

The external force acting on the stays 32 can be reduced by an external force absorbing effect of the buckling of the thin wall portions 36a, and damages to the stays 32 can be suppressed from occurring.

Therefore, according to the battery pack 1, it is possible to protect the fixing function with respect to the vehicle-side members 19 by reducing the damages to the stays 32, so that the unit cell 21 and the high power section 52b can be protected from being damaged by a large movement of the battery pack 1.

The thin wall portions 36a are disposed at positions protruding outward with respect to the width direction W1 of the vehicle than the unit cell 21 and the stays 32 are.

According to this configuration, when an external force acts on the side portion of the vehicle due to a side collision of the vehicle or the like, for example, the thin wall portions 36a can first be deformed, damaged, buckled, etc. by external force.

By the external force absorbing effect due to buckling of the thin wall portions 36a or the like at the time of the side collision of the vehicle or the like, the external force acting on the stays 32 can be reduced, thus the damage to the stays 32 can be reduced.

Therefore, according to the battery pack 1, it is possible to protect the fixing function with respect to the vehicle-side members 19 at the time of the side collision of the vehicle or the like by reducing the damages to the stays 32, so that the unit cells 21 and the heavy electrical sections 52b can be suppressed from being damaged by large moving of the battery pack 1.

The stays 32 are positioned at positions protruding more than the thin wall portions 36a do with respect to the longitudinal direction of the vehicle.

The thin wall portions 36a are disposed at positions protruding in the width direction W1 of the vehicle more than the vehicle members 19 to which the stays 32 are fixed are.

According to this configuration, since the thin wall portions 36a are disposed at the positions protruding in the width direction W1 of the vehicle more than the vehicle-side members 19 are, when an external force acts on the side portion of the vehicle due to, for example, a side collision of the vehicle, the thin wall portions 36a buckle or the like, so that the vehicle-side members 19 and the stays 32 can be protected.

Therefore, according to the battery pack 1, since the external force can be absorbed more reliably and firstly by the thin wall portions 36a, the fixing function between the battery pack 1 and the vehicle-side members 19 can be protected.

A portion of the substrate 51 placed on the base 30 located on the side opposite to the thin wall portions 36a in the width direction W1 of the vehicle corresponds to the heavy electrical section 52b where the electrical components 52 for controlling current to the unit cells 21 is disposed.

A portion of the substrate 51 located above the thin wall portions 36a corresponds to the light electrical section 52a where the electrical components 52 through which a current smaller than the heavy electrical section 52b flows is disposed.

According to this configuration, when an external force acts on the side portion of the vehicle due to a side collision of the vehicle or the like, for example, the light electrical section 52a is damaged together with buckling of the thin wall portions 36a and the like, but the heavy electrical section 52b can be protected instead.

Thereby, it is possible to provide the battery pack 1 with enhanced safety that can protect the high voltage portion 52b through which a large current flows.

The plurality of switching devices 53 for controlling the current to the unit cells 21 are not disposed on the portion of the substrate 51 located above the thin wall portions 36a, but all of them are disposed on the side opposite to the thin wall portions 36a in the width direction W1 of the vehicle.

According to this configuration, when the thin wall portions 36a buckles or the like at a position outside the high power section 52b, the thin wall portions 36a act as a cushion for absorbing shocks, so that it is possible to alleviate the load applied to the battery pack 1 from being transmitted to the high power section 52b.

Therefore, according to the battery pack 1, even when an external force is applied due to a collision or the like, for example, the heavy electrical section 52b through which a large current flows can be protected preferentially over the light electrical section 52a, so that a battery pack 1 with increased safety can be provided.

Second Embodiment

In a second embodiment, a positional relationship between a switching device 53 and a connection terminal 47a of a bus bar 47, which is another embodiment from the first embodiment, will be described with reference to FIG. 9.

The second embodiment has the same configuration as that of the first embodiment except for the positional relationship between the switching devices 53 and the connection terminals 47a of the bus bars 47, and has the same functions and effects.

That is, the second embodiment is the same as the first embodiment except for the description of the first embodiment with reference to FIG. 8.

In the following embodiment, contents different from those of the first embodiment will be described.

A battery pack 1 of the second embodiment includes a pair of switching devices 53 each composed of two switching devices 53 disposed to face each other in a direction (corresponding to the depth direction D1) orthogonal to an electrode terminal arranging direction (corresponding to the width direction W1) 53 and connection terminals 47a have the following configuration.

Figure 9:
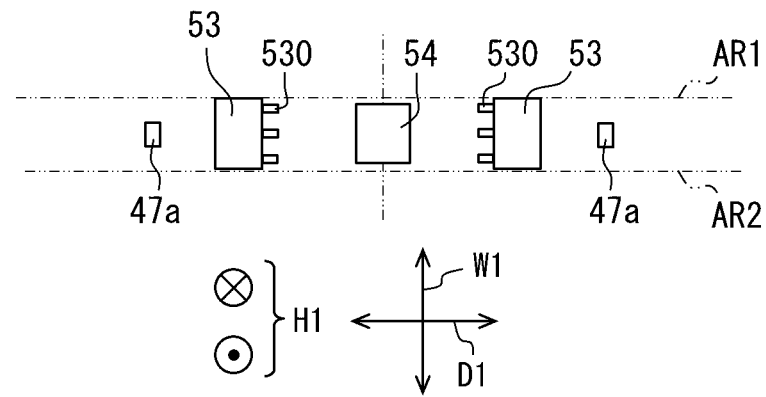
FIG. 9 shows a partial plan view of a positional relationship between a switching device and a connection terminal of a bus bar for a battery pack according to a second embodiment.
Figure 9:
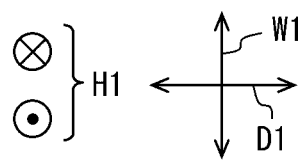

As shown in FIG. 9, the connection terminals 47a of the bus bars 47 are disposed in an area corresponding to the width of one switching device 53 in the electrode terminal arranging direction in which a plurality of electrode terminals 530 are arranged in line.

The connection terminals 47a are positioned in an area extending to a periphery of the switching devices 53 in the direction orthogonal to the electrode terminal arranging direction.

That is, the connection terminals 47a are disposed so as to be present in an area between a two-dot chain line AR1 and a two-dot chain line AR2 shown in FIG. 9.

The connection terminals 47a corresponding to the respective switching devices 53 are disposed at positions bilaterally symmetrical with respect to a center line CL1 between the two switching devices 53 constituting one set of switching devices 53.

Furthermore, a temperature detector 54 is disposed at a position in the middle of the two switching devices 53 constituting one set of switching devices 53.

The temperature detector 54 can also detect the temperature effect arising from the thermal influence from the switching devices 53 on both sides and the connection terminals 47a, similarly to the temperature detector 54 of the first embodiment, thus it is possible to provide the battery pack 1 in which the number of available temperature detectors is suppressed from increasing.

Third Embodiment

In a third embodiment, a positional relationship between a switching device 53 or a temperature detector 54 and a connection terminal 47a, which is another embodiment from the first embodiment, will be described with reference to FIG. 10.

The third embodiment has the same configuration as that of the first embodiment except for this positional relationship and has the same functions and effects.

That is, the third embodiment is the same as the first embodiment except for the description of the first embodiment with reference to FIG. 6.

In the following embodiments, contents different from those of the first embodiment will be described.

Figure 10:
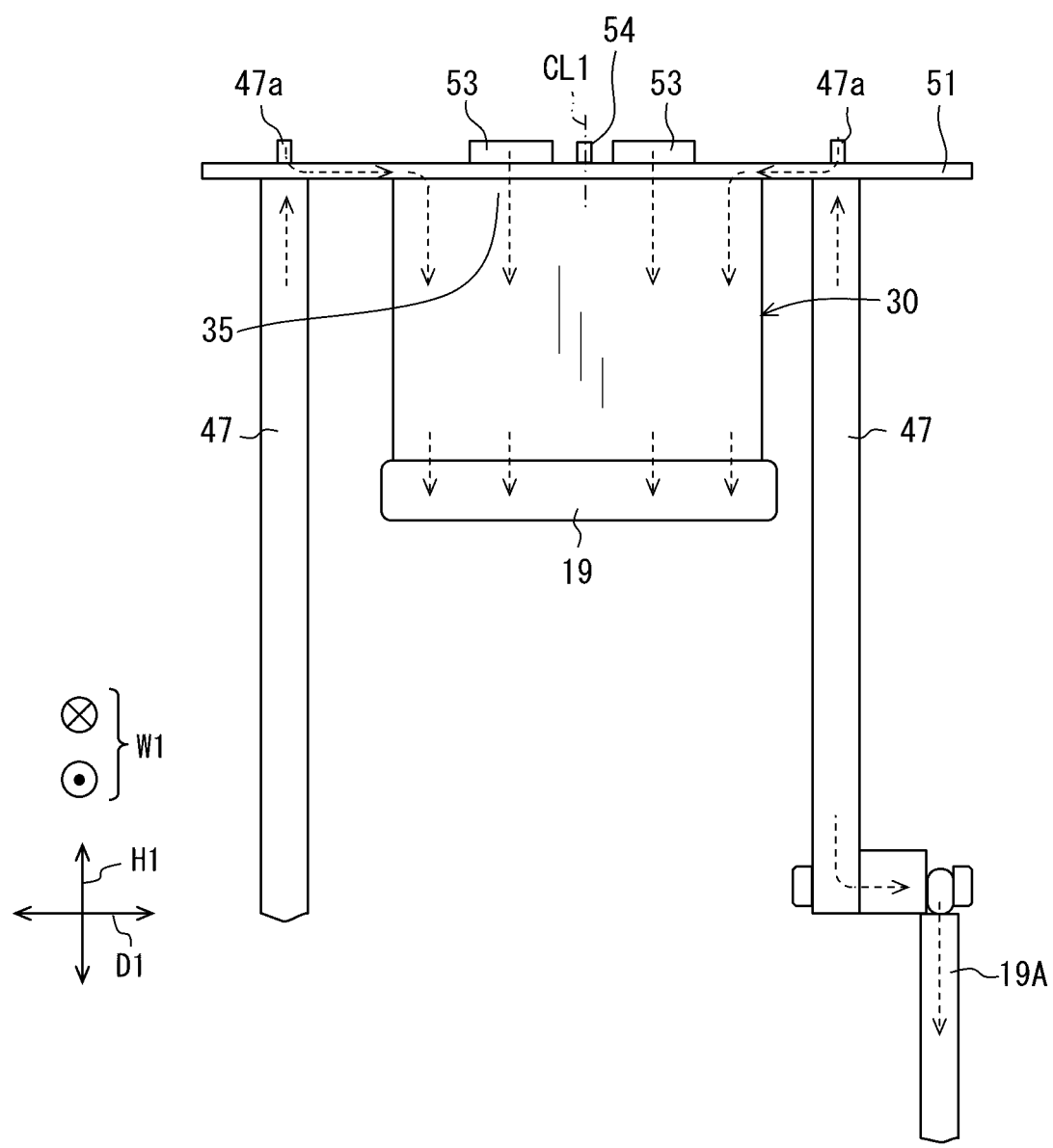
FIG. 10 is a diagram of heat transfer paths from a switching device and a bus bar in a battery pack according to a third embodiment.

As shown in FIG. 10, connection terminals 47a corresponding to each switching device 53 may have a construction of being disposed at positions which is asymmetrical with respect to a center line CL1 between the two switching devices 53 constituting one set of switching devices 53.

Furthermore, a temperature detector 54 is disposed at a position in the middle of the two switching devices 53 constituting one set of switching devices 53.

Therefore, the connection terminals 47a corresponding to each switching device 53 are disposed at positions that are asymmetrical with respect to the temperature detector 54.

OTHER EMBODIMENTS

The disclosure of this specification is not limited to the illustrated embodiments. The disclosure includes the illustrated embodiments and modifications by those skilled in the art based thereon.

For example, the disclosure is not limited to the combination of components and elements shown in the embodiments, and various modifications can be made.

The disclosure can be implemented in various combinations. The disclosure may have additional parts that may be added to the embodiments. The disclosure includes parts and elements of the embodiments being omitted.

The disclosure includes replacements of parts, elements, or combinations between one embodiment and another. The disclosed technical scope is not limited to the description of the embodiments.

The technical scope disclosed is indicated by the description of the claims and should be understood to include all modifications within the scope and meaning equivalent to the description of the claims.

The number of each of the switching device 53, the connection terminal of the bus bar, and the temperature detector 54 disposed in the predetermined area in the above-mentioned embodiments is not limited to the number described in the above embodiments.

A configuration may be adopted in which a member or material having thermal conductivity is embedded or filled between adjacent ribs 38 in the above-described embodiment. Such a member or the material is, for example, a metal of a material different from that of the base 30, a gel, a resin, or the like.

A resin containing a metal having thermal conductivity (for example, alumina-containing resin) can be adopted as the resin, for example.

The electric circuit 50 includes a plurality of switching devices 53 in the above embodiment. Alternatively, the electrical circuit 50 may include a single switching device 53.

Further, the electric circuit 50 may include a switch array in which a plurality of switching devices 53 are accommodated in a circuit package. The switch array may be mounted on the substrate 51 or may be supported away from the substrate 51.

The thin wall portions 36a in the above embodiment may be disposed over the entire length in the longitudinal direction of the vehicle at the widthwise end portion 36 of the base 30.

In this case, the thin wall portion is constituted by one groove portion extending over the entire length in the longitudinal direction of the vehicle at the widthwise end portion 36 and has a wall thickness thinner than the peripheral thickness at the widthwise end portion 36.

The thin wall portion is a fragile portion having lower rigidity than the surroundings, and is constituted by a groove portion that is recessed like a band from the lower surface side of the base 30 opposed to the vehicle-side members 19.

According to this thin wall portion, the widthwise end portion 36 is more easily broken by an external impact than the thin wall portion is, and it is possible to provide a casing which is easily buckled.

By buckling so that the widthwise end portion 36 folds over the entire length in the longitudinal direction of the vehicle, the impact transmitted to the container portion 31 can be reduced and the unit cells 21 can be protected.

In the above embodiment, the unit cells 21 constituting the battery unit 20 may have a configuration in which the exterior case is a thin flat plate shape, and the exterior case is formed of a laminate sheet, for example. The laminate sheet is made of a highly insulating material.

The unit cell 21 has, for example, an internal space of a flat container sealed by sealing end portions thereof by heat-sealing the end portions of the laminate sheet folded in half.

A battery body portion including an electrode assembly, an electrolyte, terminal connecting portions, a part of a positive electrode terminal portion, and a part of a negative electrode terminal portion are incorporated in this internal space.

Therefore, in the plurality of unit cells 21, the peripheral portion of the flat container is sealed so that the battery main body portion is contained in a sealed state inside the flat container. Each of the unit cells 21 has a pair of electrode terminals drawn outward from the flat container.

As the unit cell 21 constituting the battery unit 20 in the above embodiment, a single cell having a columnar outer shape may be used, for example.

In the above-described embodiment, the plurality of unit cells 21 constituting the battery unit 20 may be installed in a state where they are brought into contact with each other without forming a gap between adjacent unit cells, or may be a configuration providing a predetermined gap therebetween at the same time.

What is claimed is:

1. A battery pack comprising:
   a battery;
   a casing configured to accommodate the battery;
   a base formed as a part of the casing, the base having a heat dissipation wall;
   a switching device configured to control current and having a plurality of electrode terminals, the switching device being disposed so as to be configured to transfer heat to the heat dissipation wall; and
   a bus bar disposed so as to be configured to transfer heat to the heat dissipation wall, the bus bar having a connection terminal connecting the switching device and an electrical component, the connection terminal of the bus bar being entirely located in an area defined by (i) a width of the switching device in a direction in which the electrode terminals are arranged along the switching device, and (ii) a periphery of the area defined by the location of the connection terminal, which is located in a direction extending away from the switching device and orthogonal to the direction in which the electrode terminals are arranged in line.

2. The battery pack according to claim 1, wherein:
   the switching device is constituted by a plurality of switching devices arranged in line in a direction in which the plurality of electrode terminals are arranged in line; and the connection terminal of the bus bar is disposed so as to be positioned in an area corresponding to a width of the plurality of switching devices in a direction in which the plurality of electrode terminals are arranged in line and in an area extending to a periphery of the plurality of switching devices in a direction orthogonal to the direction in which the electrode terminals are arranged in line.

3. The battery pack according to claim 2, wherein the plurality of switching devices is constituted by four or more switching devices arranged in line in the direction in which the plurality of electrode terminals are arranged in line.

4. The battery pack according to claim 1, wherein:
the switching device includes at least one pair of two switching devices arranged in line to face each other in a direction orthogonal to a direction in which the plurality of electrode terminals are arranged in line; and connection terminals, including the connection terminal, are disposed at positions bilaterally symmetrical with respect to a center line between the at least two switching devices arranged in line to face each other.

5. The battery pack according to claim 1, wherein:
the switching device includes at least one pair of two switching devices arranged in line to face each other in a direction orthogonal to a direction in which the plurality of electrode terminals are arranged in line; and
a temperature detector is disposed between the at least two switching devices arranged in line to face each other.

6. The battery pack according to claim 1, wherein a connection terminal of the switching device and the connection terminal of the bus bar are disposed on a substrate and configured to transfer heat to the heat dissipation wall via the substrate.

* * * * *